US009004421B2

(12) United States Patent
Feenstra

(10) Patent No.: US 9,004,421 B2
(45) Date of Patent: Apr. 14, 2015

(54) FIRE PROTECTION SPRINKLER SUPPORT SYSTEM

(75) Inventor: Shawn J. Feenstra, Caledonia, MI (US)

(73) Assignee: The Viking Corporation, Hastings, MI (US)

( * ) Notice: Subject to any disclaimer, the term of this patent is extended or adjusted under 35 U.S.C. 154(b) by 55 days.

(21) Appl. No.: 13/287,200

(22) Filed: Nov. 2, 2011

(65) Prior Publication Data

US 2013/0105640 A1 May 2, 2013

(51) Int. Cl.

| | |
|---|---|
| ***E04B 9/20*** | (2006.01) |
| ***A62C 35/68*** | (2006.01) |
| ***E04B 9/18*** | (2006.01) |
| ***F16L 3/24*** | (2006.01) |
| *E04B 9/00* | (2006.01) |

(52) U.S. Cl.

CPC . *A62C 35/68* (2013.01); *E04B 9/18* (2013.01); *F16L 3/24* (2013.01); *E04B 9/20* (2013.01); *E04B 9/006* (2013.01)

(58) Field of Classification Search

CPC ........... A62C 35/68; F16L 3/24; E04B 9/006; E04B 9/18; E04B 9/20

USPC .......... 248/75, 200.1, 342, 343, 344, 72, 340; 169/37, 51; 52/25, 39, 506.06, 506.07, 52/713; 362/148, 150

See application file for complete search history.

(56) References Cited

U.S. PATENT DOCUMENTS

| | | | | |
|---|---|---|---|---|
| 1,442,209 A | | 1/1923 | Yoders et al. | |
| 1,585,840 A | | 5/1926 | Fahnestock | |
| 1,942,701 A | | 1/1934 | Hilton | |
| 2,297,869 A | * | 10/1942 | Biller | 248/343 |
| 2,616,646 A | | 11/1952 | Matthysse | |
| 3,329,387 A | | 7/1967 | Fischer | |
| 3,377,038 A | | 4/1968 | Loudon | |
| 3,599,921 A | * | 8/1971 | Cumber | 248/317 |
| 3,711,052 A | | 1/1973 | Hoffman | |
| 3,797,789 A | | 3/1974 | Wasson | |
| 3,998,020 A | * | 12/1976 | Kuhr et al. | 52/506.07 |
| 3,998,419 A | * | 12/1976 | Semmerling | 248/323 |
| 4,039,744 A | | 8/1977 | Seaquist | |
| 4,041,657 A | | 8/1977 | Schuplin | |
| 4,045,985 A | | 9/1977 | Musgrave | |

(Continued)

FOREIGN PATENT DOCUMENTS

| | | | |
|---|---|---|---|
| EP | 1118355 A1 | * | 7/2001 |
| JP | H0683047 U | | 11/1994 |

(Continued)

*Primary Examiner* — Terrell McKinnon
*Assistant Examiner* — Eret McNichols
(74) *Attorney, Agent, or Firm* — Harness, Dickey & Pierce, P.L.C.

(57) ABSTRACT

A support system for a fire protection sprinkler includes a support bar having a pair of end brackets disposed at the ends of the support bar. A center bracket assembly is mounted on the support bar and includes a support bracket and a hinge bracket pivotally connected to the support bracket by a hinge pin. The pair of end bracket assemblies each include an outside bracket and an inside bracket secured to the outside bracket wherein at least one of the outside and the inside bracket has an upper end connected to the support bar and includes an angled body extending laterally outward from the upper end away from the center bracket wherein the outside and inside brackets define a channel therebetween for receiving an upper rail of a T-shaped rail of a drop ceiling system.

14 Claims, 3 Drawing Sheets

(56) References Cited

U.S. PATENT DOCUMENTS

| | | | | |
|---|---|---|---|---|
| 4,060,025 | A * | 11/1977 | Pelosi, Jr. | 454/294 |
| 4,086,480 | A * | 4/1978 | Lahm | 362/148 |
| 4,114,326 | A | 9/1978 | Macuga et al. | |
| 4,114,327 | A | 9/1978 | Williams | |
| 4,122,762 | A | 10/1978 | Williams | |
| 4,126,971 | A | 11/1978 | Macuga et al. | |
| 4,149,693 | A | 4/1979 | LoNigro | |
| 4,294,054 | A * | 10/1981 | Kuhr | 52/506.07 |
| 4,630,423 | A * | 12/1986 | Lind | 52/506.06 |
| 4,717,099 | A | 1/1988 | Hubbard | |
| 4,723,749 | A | 2/1988 | Carraro et al. | |
| 4,834,186 | A | 5/1989 | Ballard | |
| 4,905,952 | A | 3/1990 | Pinquist | |
| 5,619,263 | A | 4/1997 | Laughlin et al. | |
| 6,119,784 | A | 9/2000 | MacDonald, III et al. | |
| 6,123,154 | A | 9/2000 | MacDonald, III et al. | |
| 6,260,810 | B1 | 7/2001 | Choi | |
| 6,354,800 | B1 | 3/2002 | Hays | |
| 6,488,097 | B1 | 12/2002 | MacDonald, III et al. | |
| 6,554,231 | B2 | 4/2003 | Choi | |
| 6,622,980 | B2 * | 9/2003 | Boucher et al. | 248/231.51 |
| 6,682,031 | B2 | 1/2004 | Evans et al. | |
| 6,752,218 | B2 | 6/2004 | MacDonald, III et al. | |
| 6,761,341 | B2 | 7/2004 | Pfaller | |
| 6,811,130 | B1 | 11/2004 | Oh | |
| 7,032,680 | B2 | 4/2006 | MacDonald, III et al. | |
| 7,240,884 | B2 | 7/2007 | Shim | |
| 7,255,315 | B2 | 8/2007 | Oh | |
| 7,264,214 | B2 | 9/2007 | Oh | |
| 7,427,051 | B2 | 9/2008 | Oh | |
| 7,429,025 | B1 | 9/2008 | Gretz | |
| 7,455,268 | B2 | 11/2008 | Heath | |
| 7,478,787 | B2 | 1/2009 | Bankston et al. | |
| 7,506,845 | B2 | 3/2009 | Oh | |
| 7,735,787 | B2 | 6/2010 | Kafenshtok et al. | |
| 7,735,794 | B1 | 6/2010 | Gretz | |
| 7,784,746 | B2 | 8/2010 | Kafenshtok et al. | |
| 7,845,599 | B2 | 12/2010 | Jackson | |
| 7,878,464 | B2 * | 2/2011 | Oh | 248/65 |
| 8,109,482 | B2 * | 2/2012 | Oh | 248/342 |
| 8,272,615 | B2 * | 9/2012 | Silcox et al. | 248/342 |
| 8,474,199 | B2 * | 7/2013 | Oh | 52/220.6 |
| 8,500,079 | B2 * | 8/2013 | Oh | 248/343 |
| 8,833,719 | B2 * | 9/2014 | Lim | 248/343 |
| 2001/0030269 | A1 | 10/2001 | Evans et al. | |
| 2002/0066834 | A1 | 6/2002 | Choi | |
| 2003/0029983 | A1 | 2/2003 | Pfaller | |
| 2005/0139743 | A1 | 6/2005 | Shim | |
| 2006/0192067 | A1 | 8/2006 | Oh | |
| 2007/0063121 | A1 | 3/2007 | Oh | |
| 2008/0099640 | A1 | 5/2008 | Kafenshtok et al. | |
| 2009/0065657 | A1 | 3/2009 | Heath | |
| 2010/0165646 | A1 * | 7/2010 | Russo et al. | 362/430 |
| 2011/0094760 | A1 * | 4/2011 | Im | 169/51 |
| 2011/0155865 | A1 * | 6/2011 | Oh | 248/67.7 |
| 2011/0284098 | A1 | 11/2011 | Silcox et al. | |
| 2011/0315409 | A1 * | 12/2011 | Silcox et al. | 169/51 |
| 2013/0048822 | A1 * | 2/2013 | Liu et al. | 248/316.5 |
| 2013/0161462 | A1 * | 6/2013 | Haddock | 248/237 |
| 2014/0238717 | A1 * | 8/2014 | Korcz et al. | 174/50 |

FOREIGN PATENT DOCUMENTS

| | | | |
|---|---|---|---|
| JP | 07151269 | A * | 6/1995 |
| KR | 2013010807 | A * | 1/2013 |
| WO | 2009082082 | A1 | 7/2009 |
| WO | 2011097026 | A1 | 8/2011 |

* cited by examiner

FIRE PROTECTION SPRINKLER SUPPORT SYSTEM

FIELD

The present disclosure relates to fire protection sprinklers and more particularly, to a support system for mounting fire protection sprinklers within a drop ceiling.

BACKGROUND

This section provides background information related to the present disclosure which is not necessarily prior art.

Fire protection sprinklers are commonly mounted in suspended ceiling structures by a support bar and bracket assembly system wherein the support bar is supported by a pair of end brackets which are mounted to a T-rail of the drop ceiling. A center bracket assembly is commonly used for engaging a sprinkler adapter to the support bar while a sprinkler head is suspended from the sprinkler adapter through an opening that is cut in a ceiling panel.

Various center bracket designs have been utilized for mounting the sprinkler adapter to the support bar. However, center brackets have had complicated designs and/or are cumbersome to install. Accordingly, it is desirable to provide a center bracket design that is easy to install and that is simple to manufacture.

With conventional fire protection sprinkler support systems, the support bar typically extends a full width of the space between opposing T-rails of the suspended ceiling system. In addition, the end support brackets typically extend directly vertically above the T-rail to which it is mounted. In some applications, the end brackets and support bar can interfere with the installation of light fixtures and other structures that are mounted within the suspended ceiling. Accordingly, it is desirable to provide a support system for a fire protection sprinkler that does not interfere with the installation of adjacent light fixtures and other structures within the suspending ceiling.

SUMMARY

This section provides a general summary of the disclosure, and is not a comprehensive disclosure of its full scope or all of its features.

A support system is provided for a fire protection sprinkler including a support bar having first and second ends and a pair of end brackets disposed at the ends of the support bar. A center bracket assembly is mounted on the support bar and includes a support bracket and a hinge bracket pivotally connected to the support bracket by a hinge pin. The hinge bracket and the support bracket combine to define an opening for receiving a sprinkler adapter therein, wherein the opening is disposed on a first side of the support bar and the hinge pin is disposed on the opposite side of the support bar from the first side.

According to a further aspect of the present disclosure, the pair of end bracket assemblies each include an outside bracket and an inside bracket secured to the outside bracket wherein at least one of the outside and the inside bracket has an upper end connected to the support bar and includes an angled body extending laterally outward from the upper end away from the center bracket wherein the outside and inside brackets define a channel therebetween for receiving an upper rail of a T-shaped rail of a drop ceiling system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
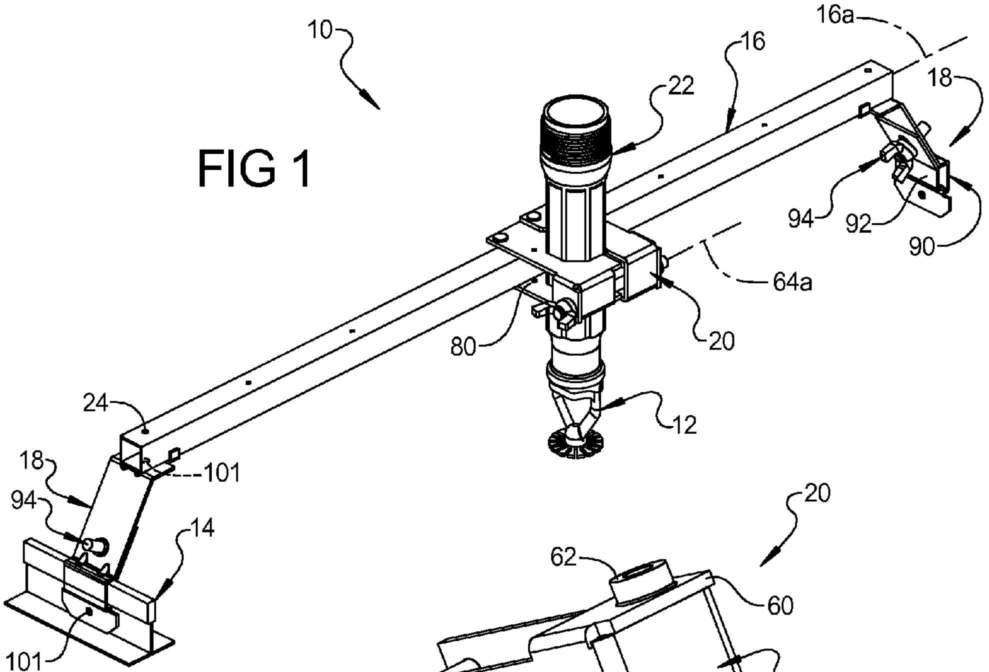
FIG. 1 is a perspective view of a support system for a fire protection sprinkler according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a support system 10 is shown for supporting a fire protection sprinkler 12 to a pair of T-rails 14 of a drop ceiling system. The support system 10 includes a support bar 16 having a pair of end bracket assemblies 18 disposed at opposite ends thereof and a center bracket assembly 20 that is supported by the support bar 16 and engages a sprinkler adapter 22.

The support bar 16 preferably has a length that can be less than a distance between opposing T-rails 14. By way of non-limiting example, the support bar 16 can be between one and four inches shorter than the span between T-rails 14. The support bar 16 can have a square cross-sectional shape, although other shapes such as round, rectangular and other shapes could also be utilized. The support bar 16 can include a plurality of indentations 24 that serve as markers for insertion of a self-tapping sheet metal screw that can be utilized for mounting the end bracket assemblies 18 to the support bar 16.

Figure 2:
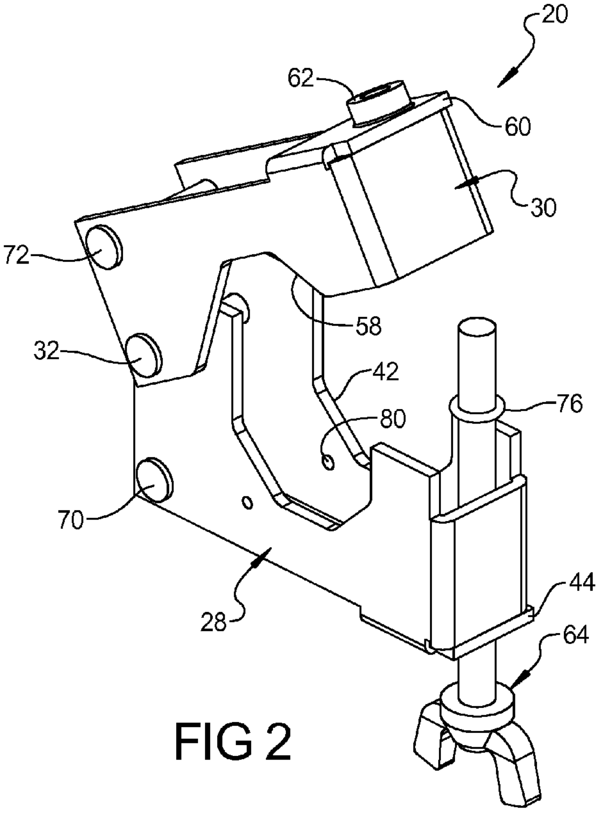
FIG. 2 is a perspective view of a center bracket assembly according to the principles of the present disclosure.
Figure 4:
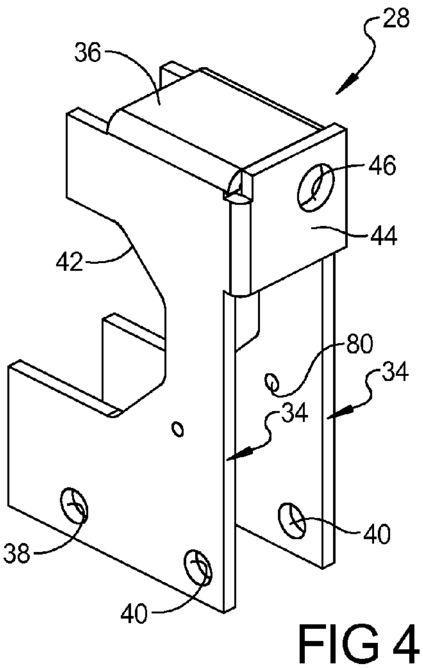
FIG. 4 is a perspective view of a support bracket of the center bracket assembly shown in FIG. 2.

With reference to FIG. 2, the center bracket assembly 20 will be described in greater detail. The center bracket assembly 20 includes a support bracket 28 and a hinge bracket 30 pivotally connected to the support bracket by a hinge pin 32. With reference to FIG. 4, the support bracket 28 includes a pair of side legs 34 connected to one another by a center member 36 to form a U-shaped body. The side legs 34 each include a hinge aperture 38 and a support aperture 40 extending therethrough. The side legs 34 also each include a recess 42 that can include a partial hexagonal surface for mating with the sprinkler adapter 22. A tab 44 can extend from one of the side legs 34 or the center member 36 and can include an aperture 46 therethrough. In the embodiment shown, the tab 44 extends from one of the side legs 34 and overlaps the other side leg as well as the center member 36 in order to provide structural support to the tab 44.

Figure 3:
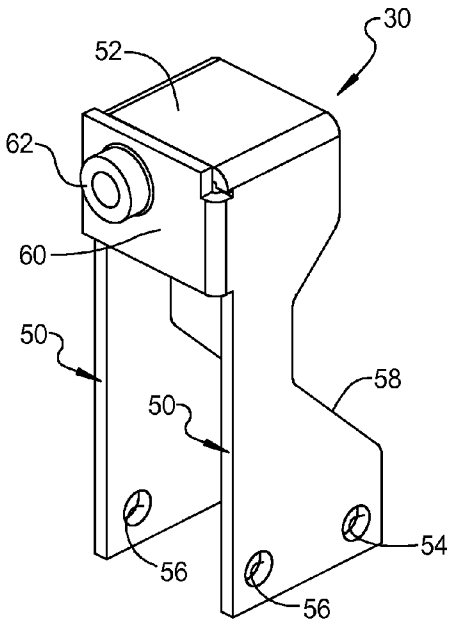
FIG. 3 is a perspective view of a hinge bracket of the center bracket assembly shown in FIG. 2.
Figure 8:
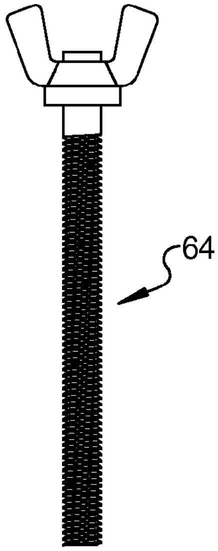
FIG. 8 is a side plan view of a wing screw used with the center bracket assembly shown in FIG. 2.
Figure 9:
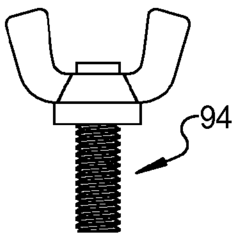
FIG. 9 is a side plan view of the wing screw used with the end bracket assembly shown in FIG. 5.

With reference to FIG. 3, the hinge bracket 30 will now be described. The hinge bracket 30 includes a pair of side legs 50 that are connected to one another by a center member 52 to form a U-shaped body. Each of the side legs 50 includes a hinge aperture 54 and a support aperture 56 extending therethrough. The side legs 50 also include a recess 58 that can define a partial hexagonal surface for engaging the sprinkler adapter 22. A tab 60 can extend from one of the side legs 50 or the center member 52 and can include an internally threaded boss 62 having internal threads for engaging with a threaded fastener, such as wing screw 64 illustrated in FIGS. 1, 2 and 8. The tab 60 as illustrated in FIG. 3 extends from one of the side legs 50, and can overlap the other side wall 50 as well as the center member 52 in order to provide structural support thereto.

In the assembled condition, as illustrated in FIG. 2, the hinge bracket 30 is pivotally connected to the support bracket 28 by the hinge pin 32. In addition, a support pin 70 is inserted through the support apertures 40 of the support bracket 28 and a support pin 72 is inserted through the support apertures 56 provided in the hinge bracket 30. The support bar 16 is inserted between the side leg 34 of the support bracket which are received between the side legs 50 of the hinge bracket 30. The support bar 16 is disposed against the hinge pin 32 and support pins 70, 72 in the assembled condition. The center bracket assembly 20 is openable to receive the sprinkler adapter 22 therein so that the hexagonal shaped recesses 42, 58 engage the sprinkler adapter 22 for defining a hexagonal opening for receipt thereof. Wing screw 64 is inserted through the aperture 46 provided in the tab 44 of the support bracket 28 and is threadedly engaged with the threaded boss 60 provided in the tab 61 of the hinge bracket 30. A bolt retainer in the form of an O-ring 76 can be mounted to the wing screw 64 in order to keep the wing screw 64 from falling out of the aperture 46 in the support bracket 28 prior to installation. The side legs 34 of the support bracket 28 can include internally extending projections 80 which can engage the support bar 16 to aid in retaining the support bracket 28 against the support bar 16 and to prevent the center bracket assembly 20 from sliding freely relative thereto when the center bracket assembly 20 is in an open condition.

Figure 5:
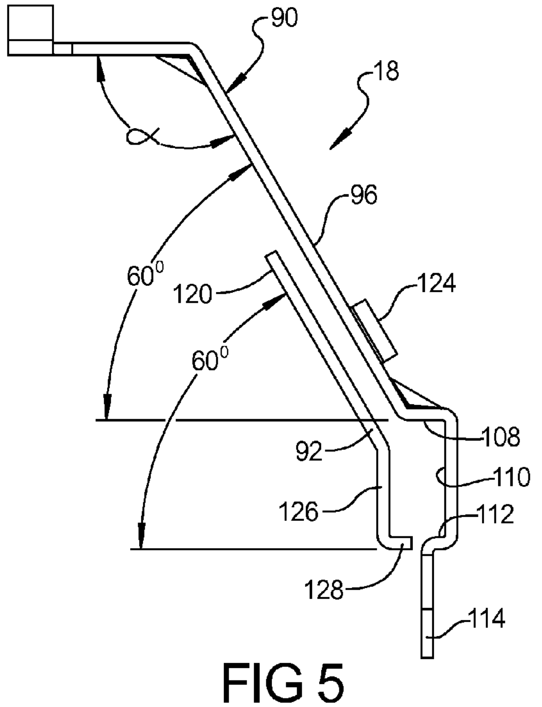
FIG. 5 is a side view of an end bracket assembly according to the principals of the present disclosure.
Figure 7:
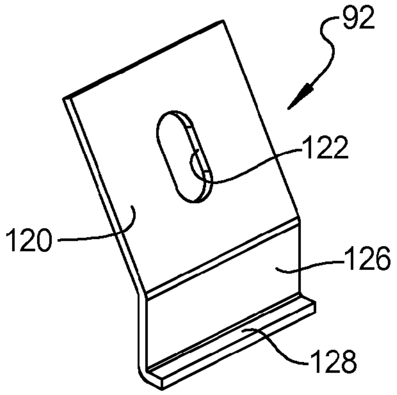
FIG. 7 is a perspective view of the inside bracket of the end bracket assembly shown in FIG. 5.
Figure 6:
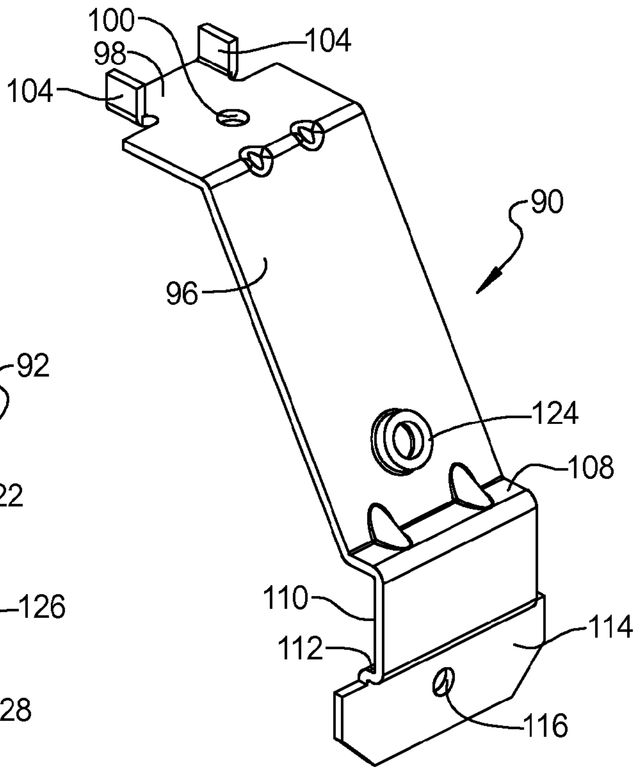
FIG. 6 is a perspective view of an outside bracket of the end bracket assembly shown in FIG. 5.

With reference to FIGS. 5-7, the end bracket assembly will now be described. The end bracket assembly 18 can include an outside bracket 90 (FIG. 6) and an inside bracket 92 (FIG. 7). The inside bracket 92 can be mounted to the outside bracket 90 by a wing screw 94 as illustrated in FIG. 1. Alternatively, the inside bracket 92 can be integrally formed with the outside bracket 90 as a bent tab extending from the main body of the outside bracket 90.

The outside bracket 90 can include an angled body 96 having a mounting tab 98 extending from an upper end thereof. Mounting tab 98 can include an aperture 100 extending therethrough for receiving a self-tapping sheet metal screw 101 that can be screwed into an underside of the support bar 16. A pair of side tabs 104 can extend from the mounting tab 98 on opposite sides thereof for engaging the support bar 16 therebetween. The side tabs 104 can be offset from the aperture 100 so as to prevent rotation of the outside bracket 90 relative to the support bar 16. The mounting tab 98 can be bent at an angle $\alpha$ of between 105° and 135° relative to the angled body 96. More preferably, the angled body 96 is angled at 120° from the mounting tab 98.

The outside bracket 90 includes an upper support surface disposed at a lower end of the angled body 96. The upper support surface 108 is designed to rest against a top of an upper bar of the T-rail of the suspended ceiling system. An outer clamp face 110 extends downward from the upper support portion 108 and is designed to be disposed against a side surface of the upper bar of the T-rail. A lower flange 112 extends inward from the outer clamp face 110 and is designed to engage underneath the upper bar of the T-rail 14. A mount flange 114 extends downward from the inner end of the lower flange 112 and can include an aperture 116 therethrough for receiving a self-tapping sheet metal screw 101 that can be screwed into the T-rail 14 of the drop ceiling system.

The inside bracket 92 includes an angled body 120 that can include an elongated slot 122 for receiving the wing screw 94 therethrough. The wing screw 94 is then inserted into the threaded aperture 124 provided in the angled body 96 of the outside bracket 90. The inside bracket 92 includes an inner clamp face 126 extending from the lower end of the angled body 120 which is designed to be disposed against the side of the upper bar of the T-rail 14. A lower flange 128 extends from a lower end of the inner clamp face 126 toward the lower flange 112 of the outside bracket 90. In the assembled condition, the wing screw 94 is tightened to draw the inside bracket 92 into tight engagement with the outside bracket 90 thereby trapping the upper bar of the T-rail 14 therebetween.

With the angled body 96 and angled body 120 of the outside an inside brackets 90, 92, extending laterally inward from the upper bar of the t-rail 14, the end bracket assembly 18 provides minimal interference with light fixtures or other structures mounted next to the ceiling panel through which the sprinkler 12 extends. Furthermore, the angled body 96 of the outside bracket 90 allows the head of the wing screw 94 to be easily accessed by an installer since the screw is angled downward for easy turning by the installer. In addition, the wing screw 64 of the center bracket assembly 20 has a longitudinal axis 64*a* that extends generally parallel to a longitudinal axis 16*a* of the support bar 16 and allows easy access for the installer to tighten the wing screw 64 without interference from other structures.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A support system for a fire protection sprinkler, comprising:

a support bar having first and second ends with a longitudinal axis extending through said first and second ends;

a pair of end brackets disposed at said ends of said support bar; and a center bracket assembly mounted on said support bar and including a support bracket and a hinge bracket pivotally connected to said support bracket by a hinge pin, said support bracket includes a first pair of opposed side legs and said hinge bracket includes a second pair of opposed side legs, said first and second pairs of opposed side legs being pivotally connected to one another by the hinge pin extending through each of said first and second pairs of opposed side legs and said support bar being received directly between said first pair of opposed side legs and said second pair of opposed side legs, said hinge bracket and said support bracket combining to define an opening for receiving a sprinkler adapter therein, wherein said opening is disposed on a first side of the longitudinal axis of said support bar and said hinge pin is disposed on an opposite side of the longitudinal axis of said support bar from said first side.

2. The support system according to claim 1, wherein said opening defined by said hinge bracket and said support bracket is hexagonal.

3. The support system according to claim 1, wherein one of said support bracket and said hinge bracket includes an aperture for receiving a threaded fastener and the other of said support bracket and said hinge bracket including a threaded aperture for receiving said threaded fastener therein and securing said center bracket assembly in a closed condition.

4. The support system according to claim 3, wherein said threaded fastener is parallel to said support bar.

5. The support system according to claim 1, wherein each of said first pair of opposed side legs of said support bracket and each of said second pair of opposed side legs of said hinge bracket each include a recess having at least three side surfaces adapted for engaging a sprinkler adapter received therein.

6. The support system according to claim 1, wherein said support bracket includes a first central portion extending between said first pair of opposed side legs and said hinge bracket includes a second central portion extending between said second pair of opposed side legs, distal ends of said first pair of opposed side legs of said support bracket and distal ends of said second pair of said hinge bracket being pivotally connected to one another and further including a first support pin extending between said first pair of opposed side legs of said support bracket and a second support pin extending between said pair of opposed side legs of said hinge bracket.

7. A support system for a fire protection sprinkler, comprising:

a support bar having first and second ends with a longitudinal axis extending through said first and second ends;

a pair of end brackets disposed at said ends of said support bar; and a center bracket assembly mounted on said support bar and including a support bracket and a hinge bracket pivotally connected to said support bracket by a hinge pin, said hinge bracket and said support bracket combining to define an opening for receiving a sprinkler adapter therein, wherein said opening is disposed on a first side of the longitudinal axis of said support bar and said hinge pin is disposed on an opposite side of the longitudinal axis of said support bar from said first side, wherein each of said support bracket and said hinge bracket includes a pair of opposed side legs pivotally connected to one another and each having a center member extending between said opposed side legs and further including a bent tab having an aperture therein for receiving a threaded fastener therein.

8. The support system according to claim 7, wherein said bent tab of said support bracket and said hinge bracket extend from one of said opposed side legs of said support bracket and said hinge bracket.

9. A support system for a fire protection sprinkler, comprising:

an elongated support bar having first and second ends;

a center bracket assembly mounted directly on said support bar at a mid-portion thereof; and a pair of end bracket assemblies disposed at said ends of said support bar and directly coupled thereto, said end bracket assemblies each including a first bracket and a second bracket formed as two separate pieces, wherein each said first bracket of said pair of end bracket assemblies has an upper end having a top surface and a bottom surface parallel to said support bar and the top surface of the upper end being secured to said support bar with a first fastener, said upper end including a first free end proximal to said center bracket assembly and a second end distal to said center bracket assembly includes a body bent directly from and laterally outward from said upper end away from said center bracket wherein an inboard surface of said body facing toward said center bracket assembly is at an angle of greater than 90 degrees relative to said bottom surface of said upper end so that an entirety of said body is disposed at an outboard side of said second end of said upper end relative to said center bracket assembly, said second bracket being fastened to said body of said first bracket only by a second fastener, said first and said second brackets defining a channel therebetween for receiving an upper rail of a T-shaped rail of a drop ceiling system.

10. The support system according to claim 9, wherein said angled body extends at an angle of between 45 and 75 degrees from said support bar.

11. A support system for a fire protection sprinkler, comprising:

an elongated support bar having first and second ends;

a center bracket assembly mounted directly on said support bar at a mid-portion thereof; and a pair of end bracket assemblies disposed at said ends of said support bar and directly coupled thereto, said end bracket assemblies each including a first bracket and a second bracket formed as two separate pieces and the second bracket being assembled to said first bracket with a first threaded fastener, wherein each said first bracket of said pair of end bracket assemblies has an upper end having a top surface and a bottom surface parallel to said support bar and said top surface being connected to said support bar, said upper end including a first free end proximal to said center bracket assembly and a second end distal to said center bracket assembly includes an angled body extending laterally outward from said upper end away from said center bracket wherein an entirety of said angled body is disposed at an outboard side of said second end of said upper end relative to said center bracket assembly, said first and said second brackets defining a channel therebetween for receiving an upper rail of a T-shaped rail of a drop ceiling system, wherein said upper end of said first bracket includes a mounting tab having an aperture therein and said first bracket of said end bracket assemblies are secured to said support bar via a second threaded fastener inserted through said aperture.

12. The support system according to claim 11, wherein said upper end includes a pair of side tabs on opposite sides of said support bar and extending generally perpendicular to said mounting tab.

13. The support system according to claim 11, wherein said angled body extends at an angle of between 105 and 135 degrees from said mounting tab.

14. The support system according to claim 13, wherein said angled body extends at an angle of approximately 120 degrees from said mounting tab.

* * * * *

UNITED STATES PATENT AND TRADEMARK OFFICE

CERTIFICATE OF CORRECTION

PATENT NO. : 9,004,421 B2
APPLICATION NO. : 13/287200
DATED : April 14, 2015
INVENTOR(S) : Shawn J. Feenstra It is certified that error appears in the above-identified patent and that said Letters Patent is hereby corrected as shown below:

In the Specification:

At column 4, line number 36, delete “60” and insert --62--, therefor.

At column 4, line number 37, delete “61” and insert --60--, therefor.

At column 5, line number 28, delete “an” and insert --and--, therefor.

At column 5, line number 29, delete “t-rail” and insert --T-rail--, therefor.

Signed and Sealed this
Fourth Day of August, 2015

Michelle K. Lee

Michelle K. Lee
*Director of the United States Patent and Trademark Office*